United States Patent [19]

McDaniel

[11] Patent Number: 5,038,981
[45] Date of Patent: Aug. 13, 1991

[54] EXTERNAL VEHICLE MOUNTED CARRIER FOR FERTILIZER AND SEED SPREADER

[76] Inventor: Stan McDaniel, 201 Cherokee Cir., Little Rock, Ark. 72205

[21] Appl. No.: 583,950

[22] Filed: Sep. 14, 1990

[51] Int. Cl.$^5$ .............................................. B60R 9/00
[52] U.S. Cl. ................................. 224/42.07; 224/42.43
[58] Field of Search .......... 224/42.43, 42.44, 42.03 R, 224/42.03 A, 42.03 B, 42.07, 42.08

[56] References Cited

U.S. PATENT DOCUMENTS

| | | | |
|---|---|---|---|
| 3,367,548 | 2/1968 | Cooper | 224/42.03 B |
| 3,521,799 | 7/1970 | Rundel . | |
| 3,591,029 | 7/1971 | Coffey | 224/42.03 B |
| 3,891,132 | 6/1975 | Chandler | 224/42.03 B |
| 4,006,852 | 2/1977 | Pilsner et al. | 224/42.03 R |
| 4,089,276 | 5/1978 | Enos . | |
| 4,406,384 | 9/1983 | Schantz . | |
| 4,775,282 | 10/1988 | Van Vliet . | |
| 4,804,120 | 2/1989 | Kraklio | 224/42.03 B |
| 4,815,638 | 3/1989 | Hutra . | |
| 4,875,608 | 10/1989 | Graber | 224/42.08 |

Primary Examiner—Linda J. Sholl
Attorney, Agent, or Firm—Ray F. Cox, Jr.

[57] ABSTRACT

This invention relates to a vehicle mounted carrier for transporting portable fertilizer and seed spreaders on utility vehicles. The carrier 1 is mounted on the rear bumper of a utility vehicle. The fertilizer and seed spreader is supported by longitudinal members 6, 7 and 8 which together with transverse members 13 and 14 provide a rigid open framework for receiving the wheels and axle of a fertilizer and seed spreader. The carrier includes hooks 22 and 23 for receiving the axle and rod 24 for locking the legs of the fertilizer and seed spreader in position. The carrier is further provided with a vertical member 2, including curved rods 32 or brackets 39 and 40 to receive and support the handle or handles of the fertilizer and seed spreader.

4 Claims, 3 Drawing Sheets

EXTERNAL VEHICLE MOUNTED CARRIER FOR FERTILIZER AND SEED SPREADER

TECHNICAL FIELD

This invention relates to a vehicle mounted carrier for transporting portable fertilizer and seed spreaders on utility vehicles particularly pickup trucks. Professional landscaping firms make extensive use of portable fertilizer and seed spreaders. The commonly used fertilizer and seed spreaders typically include a hopper for holding fertilizer, seed or other granular materials, along with some mechanism for dispersing the material as the spreader is manually pushed along the ground. The spreaders typically have two wheels mounted on a single axle located toward the front of the spreader, along with rigid supporting legs mounted to the rear which are employed when the spreader is at rest. The spreaders being manually operated also typically have a handle for use by the operator. While the commonly used spreaders employ some variations in the arrangement of their component parts, the configuration of the most popular models conform substantially to the preceding description.

Such spreaders are often transported from place to place by pickup truck, van or flatbed truck. The spreaders may be transported loaded with material in which case spills of material within the vehicle are likely. Other drawbacks to carrying a spreader inside a vehicle are that the spreader takes up valuable space inside the vehicle that may be more profitably used for other purposes such as carrying bulk materials and the spreader itself when fully loaded is quite heavy and lifting the loaded spreader into the back of a vehicle is a safety hazard. Consequently, it is desirable to provide an exterior fertilizer and seed spreader carrier that can be readily mounted on a utility type vehicle.

BACKGROUND OF PRIOR ART

Vehicle mounted carriers for transporting wheeled devices are well known in the art. Carriers have been devised for two-wheeled vehicles, such as bicycles and motorcycles, and three or four-wheeled vehicles, such as conveyances for the handicapped.

Such arrangements are disclosed in U.S. Pat. No. 4,815,638 and U.S. Pat. No. 4,775,282.

A search of the prior art has failed to reveal any such arrangements adapted for the unique features of a fertilizer and seed spreader.

SUMMARY OF THE INVENTION

The invention relates to a vehicle-mounted fertilizer and seed spreader carrier. In accordance with the invention, the carrier is mounted on a vehicle rear bumper and is provided with means for engaging and supporting the axle of a typical fertilizer and seed spreader with sufficient flexibility to adapt to a variety of sizes and shapes. The carrier also provides means to engage the supporting legs of the spreader and to lock the supporting legs in position with a simple transverse pin arrangement. Typical fertilizer and seed spreaders have handles that are connected to the framework of the spreader by either a single or a double extension. The carrier provides means for lockingly engaging either type of handle so that all commonly employed fertilizer and seed spreaders can be supported and secured on the carrier. The carrier is intended to be commonly employed on utility vehicles which normally have projecting metal bumpers with a rectangular cross-section. The carrier provides a strong yet simple method of attachment in which pins on the carrier are received into pre-drilled holes on the vehicle bumper and secured by a bolt through the carrier into the bumper. The carrier is open to accommodate varying shapes and configurations of spreaders while maintaining rigid and secure support for the spreader.

BRIEF DESCRIPTION OF THE DRAWING

The details of the invention will be described in connection with the accompanying drawing in which.

DESCRIPTION OF THE PREFERRED EMBODIMENT

Figure 1:
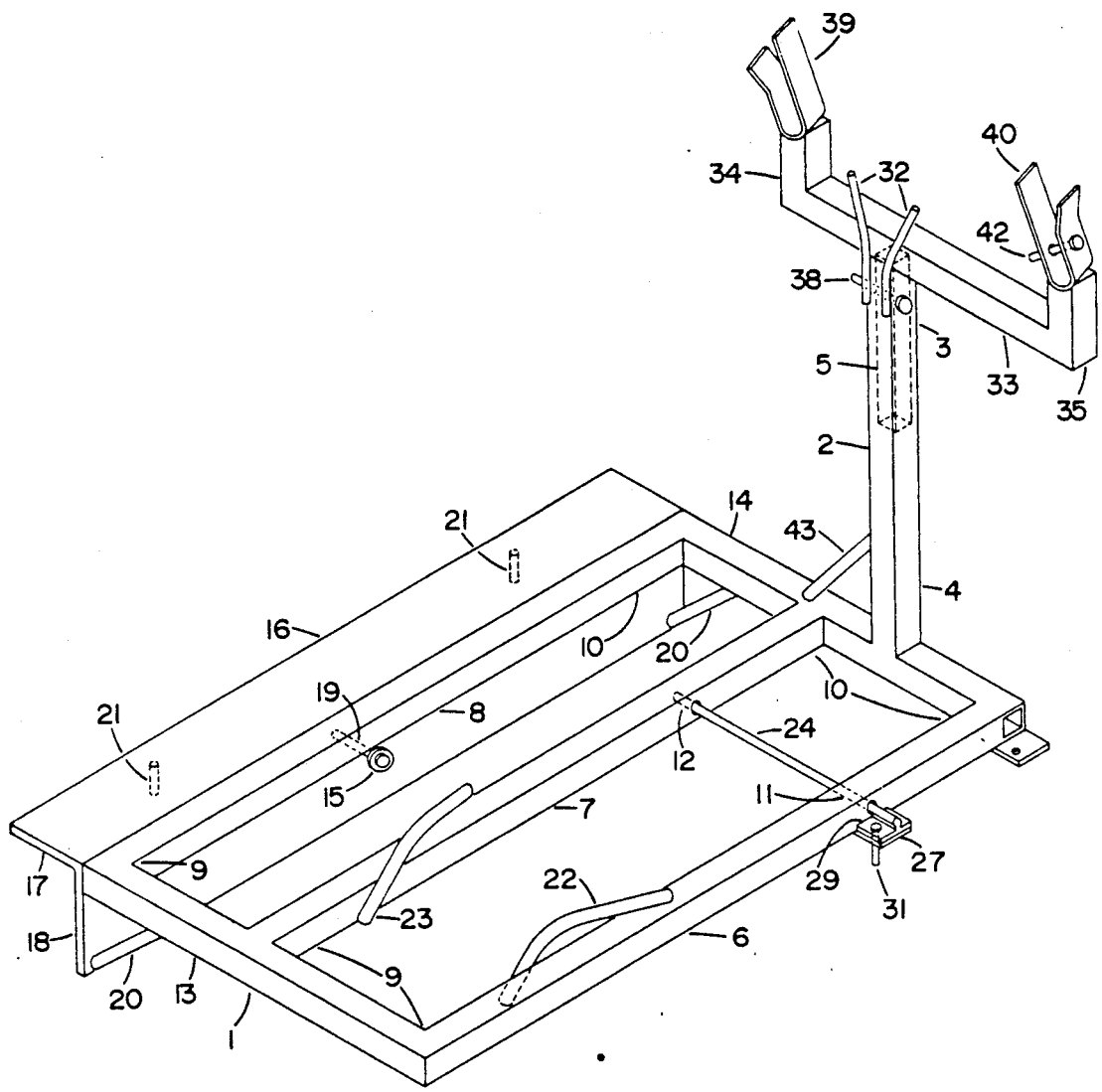
FIG. 1 is a perspective view illustrating a spreader carrier in accordance with the principals of the invention.
Figure 2:
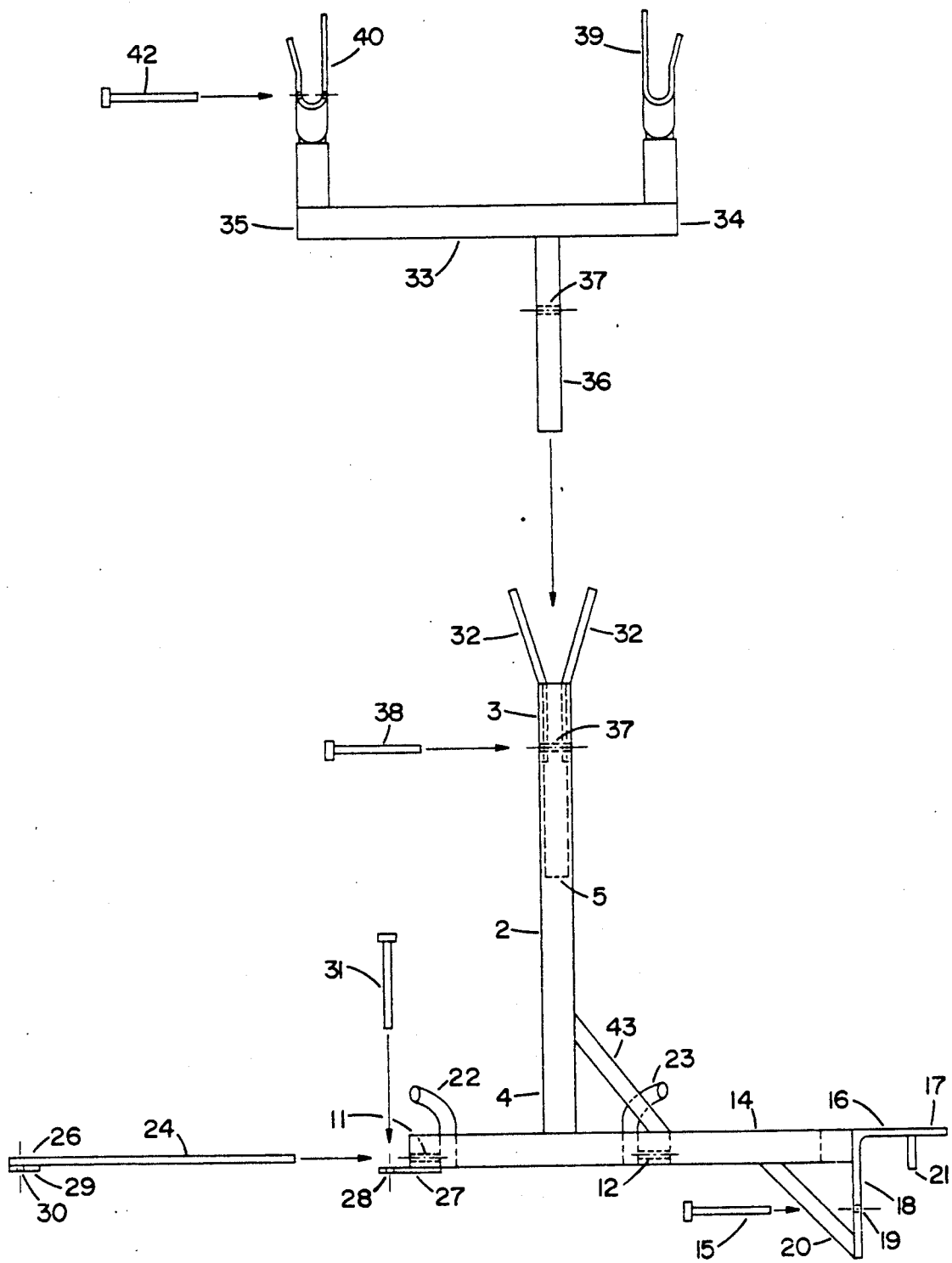
FIG. 2 is a side view of the carrier illustrating the various locking means employed in the invention.
Figure 3:
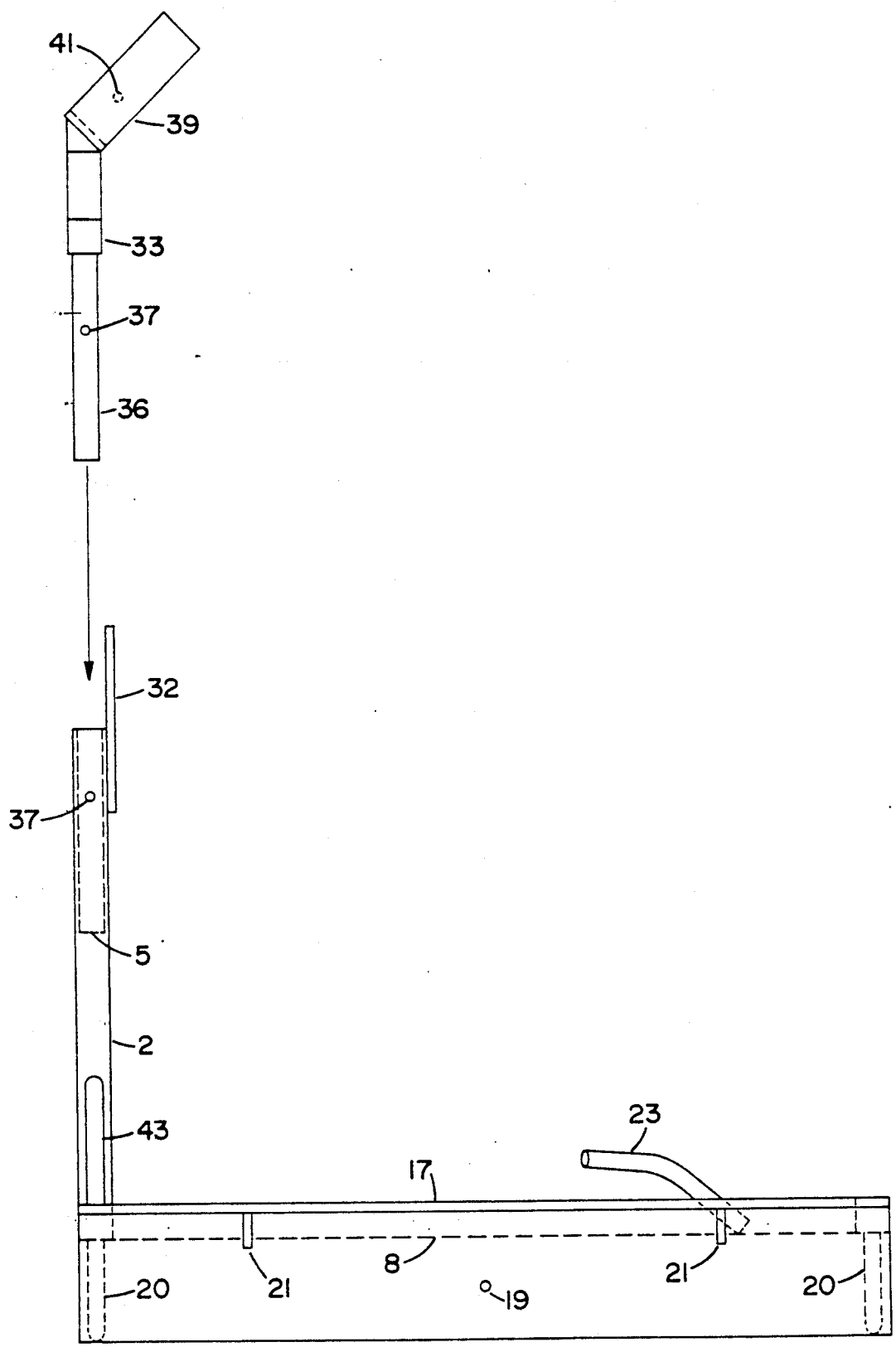
FIG. 3 is a view of the invention from the side facing the vehicle.

As illustrated in FIGS. 1, 2 and 3 a fertilizer and seed spreader carrier generally designated by the numeral 1 is provided to be attached to a utility vehicle. The carrier is constructed of three spaced longitudinal members 6, 7 and 8 attached by their ends 9 and 10 to a pair of transverse members 13 and 14 which together form a horizontal open frame. Two of the longitudinal members 6 and 7 are provided with horizontal transverse holes 11 and 12 which are coaxially aligned. The carrier is rigidly attached to a longitudinal L-shaped member 16 which has a horizontal flange 17 and a vertical flange 18. Many utility vehicles are equipped with projecting rear bumpers having a rectangular cross section. The L-shaped member 16 is adapted to conform to the shape of such a bumper. Such a bumper can be easily adapted to accommodate the mounting technique provided for the carrier. The mounting technique includes a plurality of pins 21 vertically mounted on the horizontal flange 17 and downwardly projecting so that they may be received in pre-drilled holes in the vehicle bumper. The vertical flange 18 is provided with a hole 19 through which a bolt 15 may be inserted into a pre-drilled hole in the utility vehicle bumper. The carrier may be easily mounted on or demounted from the vehicle bumper by using the bolt 15 and pin 21 arrangement. In order to provide additional support and rigidity to the carrier frame, support rods 20 are provided between the vertical flange 18 and the transverse members 13 and 14.

The spacing of the longitudinal members 6, 7 and 8 allow for space to receive the wheels of the fertilizer and seed spreader. The open arrangement, furthermore, can accommodate a variety of configurations of wheel sizes and axle widths. The space between longitudinal members 7 and 8 can accommodate one wheel while the other wheel lies outboard of longitudinal member 6. Longitudinal members 6 and 7 provide support for the axle itself.

The axle is restrained by hooks 22 and 23 which are attached to longitudinal members 6 and 7 respectively. Hooks 22 and 23 project upward from longitudinal members 6 and 7 and serve to restrain any tendency of the spreader axle to move upward or to one side.

When the fertilizer and seed spreader is positioned with its axle secured under hooks 22 and 23, its supporting leg or legs are received into the space between longitudinal members 6 and 7. Typically the supporting legs of fertilizer and seed spreaders are formed into U shapes in which the two legs at the open end of the U are attached to the spreader and the curved bottom portion of the U provides the support for the spreader when it is at rest. The insertion of rod 24 through horizontal transverse hole 11 and thence through the inside of the loop formed by the supporting leg and then into horizontal transverse hole 12 secures the supporting leg of the spreader and prevents its upward displacement.

Rod 24 may be locked into position by inserting a pin 31 through a tab 29 attached to one end of rod 24 and into a flange 27 attached to longitudinal member 6.

When the spreader is in the position described above with its axle secured under hooks 22 and 23 and its supporting leg or legs secured by rod 24 further means are provided for securing its handle. Some models of fertilizer and seed spreaders may form a handle from a single rod projecting rearward from the frame of the spreader. Vertical member 2 is provided at an appropriate height to receive and support such a handle. In addition, curved rods 32 are provided to receive the spreader handle and to prevent side to side movement. Vertical member 2 is provided additional support from support rod 43.

Certain models of fertilizer and seed spreaders employ handles fashioned from a pair of structural members projecting rearwardly from the frame of the spreader. Means are provided for supporting the handles of such spreaders. A horizontal member 33 is provided with a neck 36 which is sized to be closely received into an aperture 5 within the top portion of vertical member 2. This assembly may be locked into vertical member 2 by a pin 38. Horizontal member 33 includes a pair of brackets 39 and 40 spaced at an appropriate distance apart to receive the handles of a fertilizer and seed spreader of the type described above. The handles may be locked into position by the insertion of pins 42 through holes 41 in the brackets 39 and 40.

It should be understood that various modifications in the preferred embodiment of the invention as described above may be made without departing from the scope of the invention as defined in the following claims.

What is claimed:

1. A carrier, mountable on the rear of a vehicle having a rear bumper, for supporting and carrying a portable fertilizer and seed spreader having axle, supporting legs and a handle, comprising:
   (a) a horizontal frame comprising first, second and third spaced longitudinal members each having first and second ends, said first and second members further having respectively first and second horizontal transverse holes, said horizontal transverse holes being mutually coaxial and positioned proximal to said second ends, and first and second transverse members, said first transverse member being rigidly attached to said first ends of said spaced longitudinal members and said second transverse member being rigidly attached to said second ends of said spaced longitudinal members;
   (b) means for attaching said frame to said rear bumper comprising a longitudinal L-shaped member having horizontal and vertical flames, said horizontal flange having at least one horizontal hole for receiving said bolt; means for attaching said vertical flange to said frame such that said frame is longitudinally aligned with said L-shaped member; means for supporting said frame such that said frame is horizontally aligned with said horizontal flange; and a plurality of pins vertically attached to said horizontal flange such that said pins extend downwardly from said horizontal flange;
   (c) means coupled to said frame and adapted to engage and support said axle comprising first and second hooks attached proximal to the first ends of said first and said longitudinal member respectively and projecting toward said second ends of said longitudinal member;
   (d) means coupled to said frame for lockingly engaging said supporting legs; and
   (e) a vertical member having upper and lower ends, said upper end containing a vertical aperture, and further having means for locking engaging said handle comprising first and second curved rods attached to said upper end of said vertical member.

2. A carrier as defined in claim 1 wherein said means coupled to said frame for lockingly engaging said support legs comprises:
   (a) a rod, having inward and outward ends, of sufficient length to engage said first and second horizontal transverse holes; and
   (b) means for locking said rod in engaged position.

3. A carrier as defined in claim 2 wherein said means for locking said rod in engaged position comprises:
   (a) a flange attached exteriorly to said first longitudinal member, said flange containing a vertical hole;
   (b) a tab attached to said outward end of said rod, said tab containing a vertical hole aligned with said vertical hole of said flange; and
   (c) a locking pin for fixing said flange to said tab.

4. A carrier as defined in claim 1 wherein said means for locking engaging said handle comprises:
   (a) a horizontal member having first and second ends and a downwardly projecting neck sized to be closely received by said vertical aperture of said vertical member;
   (b) means for locking said horizontal member to said vertical member;
   (c) first and second upwarding facing brackets attached to said first and second ends respectively of said horizontal member; and
   (d) means for locking engaging said handle in said brackets.

* * * * *